United States Patent
Parla et al.

(10) Patent No.: US 12,445,527 B2
(45) Date of Patent: Oct. 14, 2025

(54) USING CLIENT-HELLO FOR INTELLIGENT ROUTING AND FIREWALLING IN MULTIPATH SECURE ACCESS SYSTEMS

(71) Applicant: Cisco Technology, Inc., San Jose, CA (US)

(72) Inventors: Vincent E. Parla, North Hampton, NH (US); Jerome Tollet, Paris (FR); Aloys Christophe Augustin, Versaille (FR); Mohammed Hawari, Montigny-le-Bretonne (FR)

(73) Assignee: Cisco Technology, Inc., San Jose, CA (US)

( * ) Notice: Subject to any disclaimer, the term of this patent is extended or adjusted under 35 U.S.C. 154(b) by 99 days.

(21) Appl. No.: 18/376,676

(22) Filed: Oct. 4, 2023

(65) Prior Publication Data
US 2025/0119471 A1  Apr. 10, 2025

(51) Int. Cl.
*H04L 67/141* (2022.01)
*H04L 9/40* (2022.01)

(52) U.S. Cl.
CPC ........ *H04L 67/141* (2013.01); *H04L 63/0272* (2013.01); *H04L 63/08* (2013.01); *H04L 63/166* (2013.01)

(58) Field of Classification Search
CPC ... H04L 67/141; H04L 63/0272; H04L 63/08; H04L 63/166
See application file for complete search history.

(56) References Cited

U.S. PATENT DOCUMENTS

| 9,032,490 B1 * | 5/2015 | Khitrenovich | .......... | G06F 21/35 |
| | | | | 713/186 |
| 11,601,288 B1 | 3/2023 | Bacon et al. | | |

(Continued)

FOREIGN PATENT DOCUMENTS

| WO | WO-2021231063 A1 * | 11/2021 | ............. H04L 45/12 |
| WO | 2023044174 A1 | 3/2023 | |

OTHER PUBLICATIONS

Feldmann A., "What's Inside a Router?", What does a Router Look Like?, Router Architecture Overview, Apr. 14, 2024, 9 Pages, XP093235624, Retrieved from https://inet-teaching.mpi-inf.mpg.de/videos/DataNetworks/media/031_DN20.Router/031_DN22_VL16_RouterArchitecture.pdf on Dec. 18, 2024, Slide 5.

(Continued)

*Primary Examiner* — Caroline H Jahnige
(74) *Attorney, Agent, or Firm* — Lee & Hayes, P.C.

(57) ABSTRACT

Techniques for utilizing a portion of a communication session identifier (e.g., a Session-ID, an SPI, a CID, a DCID, and/or the like) to indicate a target routing device (e.g., a VPN and/or ZTNA termination device) for establishing control plane session(s) and/or data plane session(s) at wire-speed in a networked computing environment. The routing device(s) of a networked computing environment may generate a communication session identifier and send the communication session identifier to the client device, such that subsequent packets send from the client device may be forwarded to the proper routing device indicated by the communication session identifier for establishment of one or more data plane sessions. Additionally, data plane sessions may be established using a Resumed Handshake rather than a full handshake that is typically required, as Session Resumption utilizes the assigned communication session identifier for mapping.

20 Claims, 12 Drawing Sheets

(56) References Cited

U.S. PATENT DOCUMENTS

| | | |
|---|---|---|
| 2005/0038905 A1 | 2/2005 | Banes et al. |
| 2005/0038906 A1* | 2/2005 | Banes ................. H04L 67/1008 |
| | | 709/238 |
| 2010/0318784 A1 | 12/2010 | Rao et al. |
| 2013/0305036 A1* | 11/2013 | Vos ....................... H04L 63/166 |
| | | 713/151 |
| 2016/0036862 A1 | 2/2016 | Bagepalli et al. |
| 2019/0394174 A1* | 12/2019 | Sillankorva ........... H04L 9/0643 |
| 2021/0367920 A1 | 11/2021 | Devarajan et al. |
| 2022/0191141 A1 | 6/2022 | Duraj et al. |
| 2022/0231864 A1 | 7/2022 | Devarajan et al. |
| 2023/0015687 A1 | 1/2023 | Parla et al. |
| 2023/0353421 A1* | 11/2023 | Hatte ................. H04L 12/4633 |

OTHER PUBLICATIONS

International Search Report and Written Opinion for International Application No. PCT/US2024/048354, mailed Jan. 10, 2025, 15 Pages.

Son J., et al., "Protego: Cloud-Scale Multitenant IPsec Gateway", USENIX, The Advanced Computing Systems Association, Jul. 12, 2017, pp. 480-492, Jul. 12-14, 2017, XP061025254, pp. 473-485, Retrieved from https://www.usenix.org/sites/default/files/atc17_proceedings_interior.pdf on Jul. 12, 2017, Abstract.

* cited by examiner

USING CLIENT-HELLO FOR INTELLIGENT ROUTING AND FIREWALLING IN MULTIPATH SECURE ACCESS SYSTEMS

TECHNICAL FIELD

The present disclosure relates generally to using (D) TLS client-hello, and similar techniques, to perform intelligent routing, load balancing, and layer 3 firewalling for multipath and/or multi-tunnel secure access systems.

BACKGROUND

Cloud-based service provider networks, often described as 'hyperscalers', offer cloud-based services to fulfill users' computing-service needs without the users having to invest in and maintain computing infrastructure required to implement the services. For example, cloud service providers may operate networks of data centers housing significant numbers of interconnected computing systems, such as public data centers, that are configured by the service provider to provide cloud-based services to users (or "customers"). These service provider networks may provide network-based computing resources on an as-needed basis. For example, a service provider network may permit users to purchase and utilize computing resources such as virtual machine ("VM") instances, compute resources, data storage resources, database resources, networking resources, network services, and other types of computing resources. Users may configure the computing resources provided by a service provider network to implement desired functionality, such as to provide a network-based application or another type of functionality to an enterprise of users. While hyperscaler-based datacenters are growing in popularity, traditional enterprise-managed datacenters are still widely used. The combination of these deployments is usually described as 'hybrid' datacenters. Generally, remote users are able to connect to these network-based applications and/or enterprise functionalities using Zero Trust Network Access (ZTNA) and/or virtual private networking (VPN) solutions.

Many VPN and/or ZTNA technologies have an independent control plane and data plane protocol. For example, internet protocol security (IPsec) has internet key exchange (IKE) for the control plane, and encapsulating security payload (ESP) for the data plane. Similarly, datagram transport layer security (DTLS)-VPN has transport layer security (TLS) for the control plane and DTLS for the data plane. Both VPN and ZTNA solutions can often have many data plane sessions associated with a single control plane session. Additionally, Anycast networking introduces another layer of complexity in that multiple datacenters can host a ZTNA and/or VPN termination point that shares a common internet protocol (IP) address space with other datacenters. Moreover, to facilitate multipathing, it is often desirable to have a client initiate multiple data plane sessions and have the solution map each session to a different datacenter. This would be a common construct in a cloud offering, such as, for example, a secure access service edge (SASE) solution.

In such a configuration, the client would have multiple data plane sessions where each session is directed to a specific datacenter based on some intelligent load balancing scheme that ensures that each tunnel goes to a different datacenter (or a different region within a single datacenter). This allows for multipathing with both VPN and ZTNA to operate in an Anycast ecosystem. Additionally, there may be a desire to route traffic from a given endpoint to a specific termination point within a region and/or datacenter based on a number of factors. For example, it may be desirable to route a data plane session to the same termination node as a control plane session, to a different termination node within a region and/or data center due to load, and/or to a specific node to enable security service(s) and/or service chaining for a given session and/or to a node that has better proximity to a workload or application. However, the problem currently is how to create such a system since the target domain for all the tunnels will likely be the same and the IP address associated with them would also be the same when Anycast is used. While it may be theoretically possible to use domain naming and server name indicator (SNI) to do this dynamic routing, it is quite difficult to manage and maintain the number of unique domain name system (DNS) entries in practice to create such a dynamic system.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
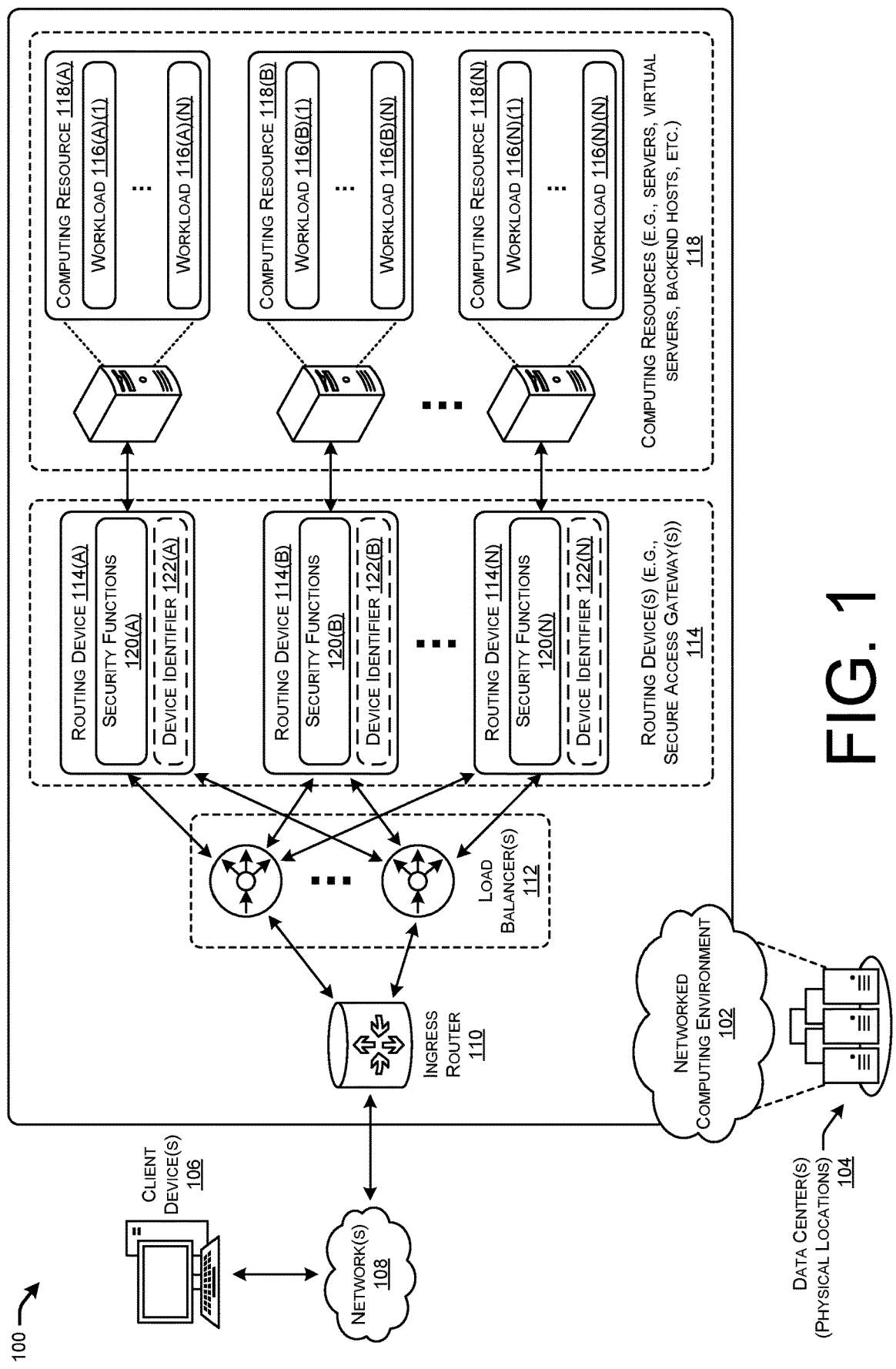
FIG. 1 illustrates a system-architecture diagram of an example environment for a networked computing environment to perform the routing, load-balancing, and/or firewalling techniques according to the techniques described herein.

This disclosure describes method(s) for using client-hello to perform intelligent routing, load balancing, and layer 3 firewalling for multipath and/or multi-tunnel secure access systems. The method includes receiving, at one or more routing devices of a networked computing environment and from a client device, a first control packet. Additionally, or alternatively, the method includes generating a communication session identifier associated with the client device. In some examples, the communication session identifier may include one or more first bits indicating a workload associated with the client device and/or one or more second bits indicating a first routing device of the one or more routing devices. Additionally, or alternatively, the method includes establishing a first control plane session between the first routing device and the client device. Additionally, or alternatively, the method includes sending, via the first control plane session, a second control packet including an indication of the communication session identifier. Additionally, or alternatively, the method includes receiving, at the first routing device, a first data packet including the communication session identifier. Additionally, or alternatively, the method includes establishing a first data plane session between the first routing device and the client device.

Additionally, or alternatively, the method includes establishing a first communication session between a client device and one or more routing devices of a networked computing environment, the first communication session comprising a control plane session and a data plane session. Additionally, or alternatively, the method includes sending a communication session identifier to the client device. In some examples, the communication session identifier may include one or more first bits indicating the first communication session and/or one or more second bits indicating a first routing device of the one or more routing devices. Additionally, or alternatively, the method includes determining that the data plane session of the first communication session has been disrupted. Additionally, or alternatively, the method includes receiving, at the first routing device of the one or more routing devices of the networked computing environment, a data packet including the communication session identifier. Additionally, or alternatively, the method includes reestablishing, by the first routing device, the first communication session between the client device and the first routing device based at least in part on the data packet. In some examples, reestablishing the first communication session may comprise reestablishing the data plane session.

Additionally, the techniques described herein may be performed by a system and/or device having non-transitory computer-readable media storing computer-executable instructions that, when executed by one or more processors, performs the method described above.

EXAMPLE EMBODIMENTS

As previously described, VPN and/or ZTNA technologies have an independent control plane and data plane protocol and can have many data plane sessions associated with a single control plane session. During the setup of each data plane session, a control plane message may be sent to a termination device. The response to such a configuration message is typically focused on various routing and DNS settings required by the device(s) to setup the appropriate tunnel(s) for communication. This disclosure describes techniques for making an a priori assignment of the Session-ID to be associated with a given tunnel through the network (e.g., targeting a given routing device). In some examples, routing device(s) (e.g., a terminating device, a network gateway, a secure access server, a colocation gateway, etc.) may be configured to receive a control packet from a client device, generate communication session identifier(s) (e.g., a Session-ID, a connection ID (CID), a destination connection ID (DCID), etc.) associated with the client device and indicating a target routing device for establishing data plane sessions, and establish one or more data plane session(s) based on receiving a data packet and identifying the communication session identifier. For example, a client device may establish a connection to an anycast IP address and the connection may be load-balanced to a load-balancer node from among many load-balancer nodes, where a first communication session (e.g., a control plane session) may be established with a first routing device of one or more routing devices. The first routing device may generate the communication session identifier, including one or more bits identifying a target routing device to forward connections to going forward and send the communication session identifier (or an indicator thereof) to the client device. The client device may then send a data packet including the communication session identifier, where a load-balancer node may identify the target routing device based on the one or more bits represented by the communication session identifier, and forward the data packet to the target routing device, where a second communication session (e.g., a data plane session) may be established with the second routing device. Additionally, or alternatively, the techniques described herein provide the unique benefit of allowing a data plane session to be setup using a resumed handshake instead of a full handshake (e.g., a DTLS handshake), which is typically required to establish a data plane session. For example, a first data plane session may be disrupted while the control plane session resumes. However, since session resumption uses the assigned Session-ID for mapping, an encrypted data plane session can rapidly be established as a result of identifying the communication session identifier in a data packet.

The routing device may be configured as a VPN and/or a ZTNA terminating device configured to establish control plane session(s) and/or data plane session(s) with client device(s) using various protocols, such as, for example, IKE, TLS, QUIC transport protocol (over user datagram protocol (UDP)), and/or the like for control plane sessions, and ESP, DTLS, QUIC, and/or the like for data plane sessions. The routing device may also be configured to generate a communication session identifier associated with a client device. The communication session identifier may be configured as security parameter index (SPI) when IPsec ESP is utilized as a data plane protocol, a connection ID (CID) in examples where DTLS is utilized as a data plane protocol, a destination connection ID (DCID) in examples where QUIC is utilized as a data plane protocol, and/or the like. For example, one or more bit(s) of a Session-ID, CID, and/or DCID may be reserved and utilized to indicate a given routing device (or network tunnel) for routing a data plane session. For example, the last bit(s) of the communication session identifier may be "5" indicating that the routing device corresponding to the indicator "5" is to establish the data plane session. That is, one or more routing devices may determine a target routing device of the one or more routing devices, cause the target routing device to establish a first control session with a client device, generate a communication session identifier indicating the target routing device, and send an indication of the communication session identifier to the client device. As such, data packet(s) sent from the client device and including the communication session identifier will reach the load-balancer nodes and be routed to the target routing device indicated by the communication session identifier to establish one or more data plane session. In examples where an encrypted Client Hello is used, load-balancing nodes may be equipped with the appropriate encryption keys to decrypt at least the encrypted Client Hello header portion of the payload. Additionally, or alternatively, a routing device may be configured to authenticate a client device prior to establishing a control session and/or a data session, such that, for example, an authentication and configuration exchange may occur between the client device and the routing device.

By configuring the communication session identifier according to the techniques described herein (e.g., a priori assignment of a Session-ID, CID, and/or DCID to be associated with a given tunnel/routing device) it may be possible to map the session in advance to a desired destination using the communication session identifier as a routing indicator. This mapping could include load-balancing and/or actual steering to a designated device (e.g., a particular VPN/ZTNA terminator). Additionally, or alternatively, it may be possible to rapidly setup the encrypted data plane session using a Resumed Handshake. This is because Session Resumption uses the assigned Session-ID (or equivalent thereof) for mapping. To facilitate the data plane setup with Resumed Handshake, the routing device may propose a secret key as a part of the control plane exchange in order to bootstrap the cryptographic parameters to facilitate Session Resumption. In some examples, this process may be similar to zero round trip time resumption (0-RTT) bootstrapping that is used in QUIC, multiplexed application substrate over QUIC encryption (MASQUE), and/or hypertext transfer protocol version 3 (HTTP/3) sessions and may also provide a similar ecosystem for those protocol connections as well as for DTLS, TLS, IPsec tunnels, and/or the like. Additionally, or alternatively, the IPsec ESP header SPI attribute may be used in a similar manner to the DTLS client hello Session-ID.

The routing devices may be configured to determine a target routing device in various ways and/or to accomplish various goals. In some examples, the routing devices may be configured to determine the target routing device based on any load-balancing techniques. For example, a routing device determined to be at a first usage (e.g., load of the various sessions handled by the routing device) that is below a threshold usage may be a candidate for the target routing device for a given session with a client device. Additionally, a data plane session may be routed from a first routing device to a second routing device within a region or a data center due to load. Additionally, or alternatively, the routing devices may be configured to enforce one or more policies for determining the target routing device. For example, policies may be client-based (e.g., a given client requires service chaining, a given client is to connect to a specific routing device, etc.), application-based (e.g., a given application requires service chaining, a session associated with a given application is to be established by a specific routing device, etc.), and/or the like. Additionally, or alternatively, a target routing device may be determined based on one or more service(s) (e.g., firewall service(s) such as, for example, a cloud-delivered firewall (CDFW) service, data loss prevention (DLP) service, and/or the like) offered by the routing device. For example, a communication session may require a first service that is offered by a first routing device and not offered by a second routing device, and as such the first routing device may be selected as the target routing device over the second routing device for the communication session. Additionally, or alternatively, a given routing device may be configured for service chaining and selected as a target routing device over a second routing device that is not configured for service chaining. In some examples, the target routing device may be determined for actual steering to a designated routing device.

In order to send the data channel connection to the correct routing device without the techniques described herein, the load-balancer node must match the data channel connection to an existing control channel connection (potentially processed by another node). It has very limited information available to do so. When a load-balancer node reviews a first DTLS packet, the information is has access to is only the client source IP address and the SNI extension in a DTLS client hello message. The source port is not reliable as it may be change by network address translation (NAT) gateways on the path. As a result, a system unequip with the techniques described herein would be required to send all connections coming from a given IP address and destined to the same SNI name to the same routing device. This results in very imbalanced loads across routing devices (e.g., when may workers connect from the same office, they would all end up on the same routing device). In contrast, utilizing the techniques described herein, the session-ID field (e.g., the communication session identifier) in a DTLS client hello message is present in the first packet of the data channel connection and it can encode information that indicates to the load-balancing nodes which routing device the connection should be forwarded to. While a key/value mapping could be used, an optimization is performed where the routing device identity is inferred by the session-ID value without the need for a lookup.

As described herein, a computing-based, cloud-based solution, routing device, can generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to routing and/or firewalling in VPN and/or ZTNA solutions, increasing routing efficiencies in networks. For instance, the techniques described herein include an a priori generation of a communication session identifier by a routing device (e.g., a VPN/ZTNA termination device) where a portion of the communication session identifier indicates a target routing device for establishing a data plane session. By configuring the routing device to generate and assign the communication session identifier, wire-speed mapping can be done without the need to terminate a UDP session or to perform a lookup in a key/value data store. For example, a load-balancing device may identify the target routing device indicated by the communication session identifier and forward subsequent control and/or data packets to the target routing device without performing a lookup, thus reducing the cost of routing by the load-balancing devices and/or other intermediary networking devices in the network. Accordingly, a data plane session may be established using a Resumed Handshake including the communication session identifier. This allows for the ability to rapidly setup the encrypted data plane sessions using Session Resumption. Further, if a data plane session is interrupted, the data plane session may be reestablished without having to reconfigure the control plane again. As such, network bandwidth and/or computing resources may be preserved by utilizing an a priori assignment of a communication session identifier configured to target a routing device for establishing control plane and/or data plane sessions. Additionally, connections may be load-balanced with no constrains on the routing device choice, resulting in more balanced load, and in a more scalable system.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 for a networked computing environment 102 to perform the routing, load-balancing, and/or firewalling techniques according to the techniques described herein. Generally, the networked computing environment 102 may include devices that are housed or located in one or more data centers 104 that may be located at different physical locations. For instance, the networked computing environment 102 may be supported by networks of devices in a public cloud computing platform, a private/enterprise computing platform, and/or any combination thereof. The one or more data centers 104 may be physical facilities or buildings located across geographic areas that are designated to store networked devices that are part of the networked computing environment 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the networked computing environment 102 may not be located in explicitly defined data centers 104 and, rather, may be located in other locations or buildings.

The networked computing environment 102 may be accessible to client devices 106 over one or more networks 108, such as the Internet. The networked computing environment 102, and the networks 108, may each respectively include one or more networks implemented by any viable communication technology, such as wired and/or wireless modalities and/or technologies. The networked computing environment 102 and networks 108 may each include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The networked computing environment 102 may include devices, virtual resources, or other nodes that relay packets from one network segment to another by nodes in the computer network.

In some examples, the networked computing environment 102 may provide, host, or otherwise support one or more application services for client devices 106 to connect to and use. The client devices 106 may comprise any type of device configured to communicate using various communication protocols (e.g., VPN, SSL, TLS, DTLS, QUIC, IPsec, and/or any other protocol) over the networks 108. For instance, the client device 106 may comprise a personal user device (e.g., desktop computers, laptop computers, phones, tablets, wearable devices, entertainment devices such as televisions, etc.), network devices (e.g., servers, routers, switches, access points, etc.), and/or any other type of computing device.

In some examples, the networked computing environment 102 may include one or more ingress routers 110 which may be configured to route incoming packets based on, for example, ECMP routing. For instance, the ingress router 110 may use ECMP, which is a strategy where next-hop packet forwarding to a single destination can occur over multiple "best paths" which tie for top place in routing metric calculations. Further, an routing strategy may be used by the ingress routers 110, such as Open Shortest Path First (OSPF), Intermediate System to Intermediate System (ISIS), Enhanced Interior Gateway Routing Protocol (EIGRP), and/or Border Gateway Protocol (BGP) in conjunction with ECMP routing.

The ingress router(s) 110 may balance traffic in order to route packets to one or more load balancers 112(1)-(N) (herein after referred to collectively as "load balancers 112," and where N represents any number greater than or equal to 1) that are deployed in the networked computing environment 102. The load balancers 112 may be configured to load balance and route packets to one or more routing devices 114(1)-(N) (herein after referred to collectively as "routing devices 114," and where N represents any number greater than or equal to 1. The routing devices 114 may be configured as a VPN terminating device and/or a ZTNA terminating device. Additionally, or alternatively, the routing devices 114 may be configured to establish one or more control plane sessions and/or data plane sessions with the client device(s) 106. In some examples, the routing devices 114 may be required to enforce authentication of a client device 106 establishing connection(s) to one or more workload(s) 116 (A)(1)-(N)(N) executing on one or more computing resources 118(A)-(N) of the network computing environment 102, where N may be any integer greater than 1. As shown, each computing resource 118 may comprise one or more workloads 116 executing thereon. Additionally, or alternatively, each computing resource 118 may comprise one or more IP addresses, such as an Anycast IP address that is the same across all computing resource(s) 118.

The routing device(s) 114 may be configured as a VPN and/or a ZTNA terminating device configured to establish control plane session(s) and/or data plane session(s) with client device(s) 106 using various protocols, such as, for example, IKE, TLS, QUIC transport protocol (over user datagram protocol (UDP)), and/or the like for control plane sessions, and ESP, DTLS, QUIC, and/or the like for data plane sessions. The routing devices 114 may be configured to provide various security function(s) 120 and/or service chaining functionality, such as, for example, a cloud-delivered firewall (CDFW) service, data loss prevention (DLP) service, and/or the like. Additionally, or alternatively, the routing devices 114 may enforce authentication of client devices for access to the workloads 116 executing on the computing resources 118 of the networked computing environment 102. Additionally, each routing device 114 may have a corresponding device identifier 122. In some examples, a device identifier 122 may be represented by one or more bits as an integer.

Take, for example, a client device 106 attempting to connect to a workload 116 hosted by a given computing resource 118 of the networked computing environment 102. For example, the workload(s) 116 may be associated with an Anycast IP address, and the client device 106 may establish a connection to the Anycast IP address. The connection may first be load balanced by the ingress router 110 using ECMP to a given load balancer node 112. The load balancer node 112 that receives the connection will then forward the connection to a routing device 114.

In some examples, the routing device 114 may determine a target routing device 114 of the one or more routing devices 114(A)-(N) should handle the connection. The routing devices 114 may be configured to determine a target routing device 114 in various ways and/or to accomplish various goals. In some examples, the routing devices 114 may be configured to determine the target routing device 114 based on any load-balancing techniques. For example, a routing device 114 determined to be at a first usage (e.g., load of the various sessions handled by the routing device) that is below a threshold usage may be a candidate for the target routing device 114 for a given session with a client device 106. Additionally, a data plane session may be routed (e.g., balanced) from a first routing device 114 (A) to a second routing device 114(B) within a region or a data center 104 due to load. Additionally, or alternatively, the routing devices 114 may be configured to enforce one or more policies for determining the target routing device 114. For example, policies may be client-based (e.g., a given client requires service chaining, a given client is to connect to a specific routing device 114, etc.), workload-based (e.g., a given workload 116 requires service chaining, a session associated with a given workload 116 is to be established by a specific routing device 114, etc.), and/or the like. Additionally, or alternatively, a target routing device 114 may be determined based on one or more service(s) 120 (e.g., firewall service(s) such as, for example, a cloud-delivered firewall (CDFW) service, data loss prevention (DLP) service, and/or the like) offered by the routing device 114. For example, a communication session may require a first service (e.g., security functions 120(A)) that is offered by a first routing device 114 (A) and not offered by a second routing device 114(B), and as such the first routing device 114 (A) may be selected as the target routing device 114 over the second routing device 114(B) for the communication session. Additionally, or alternatively, a first routing device 114 (A) may be configured for service chaining and selected as a target routing device 114 over a second routing device 114(B) that is not configured for service chaining. In some examples, the target routing device 114 may be determined for actual steering to a designated routing device 114.

The routing device 114 may then be configured to generate a communication session identifier associated with a client device 106. The communication session identifier may be configured as security parameter index (SPI) when IPsec ESP is utilized as a data plane protocol, a connection ID (CID) in examples where DTLS is utilized as a data plane protocol, a destination connection ID (DCID) in examples where QUIC is utilized as a data plane protocol, and/or the like. For example, one or more bits of a Session-ID, CID, and/or DCID may be reserved and utilized to indicate a given routing device (or network tunnel) for routing a data plane session. For example, the last bit of the communication session identifier may be "5" indicating that the routing device 114 having a corresponding device identifier 122 of "5" is to establish the data plane session. That is, if a first routing device 114 (A) of one or more routing devices 114 has the device identifier 122(A) of "5", the first routing device 114 (A) may establish a first control session with the client device 106, generate a communication session identifier indicating the target routing device 114 (A), and send an indication of the communication session identifier to the client device 106. As such, subsequent data packet(s) sent from the client device 106 and including the communication session identifier will reach the load-balancer nodes 112 and be routed to the target routing device 114 (A) indicated by the communication session identifier to establish one or more data plane session. In examples where an encrypted Client Hello is used, load-balancing nodes 112 may be equipped with the appropriate encryption keys to decrypt at least the encrypted Client Hello header portion of the payload. Additionally, or alternatively, a routing device 114 may be configured to authenticate a client device 106 prior to establishing a control session and/or a data session, such that, for example, an authentication and configuration exchange may occur between the client device 106 and the target routing device 114.

By configuring the communication session identifier according to the techniques described herein (e.g., a priori assignment of a Session-ID, CID, and/or DCID to be associated with a given tunnel/routing device) it may be possible to map the session in advance to a desired destination using a portion of the communication session identifier to indicate a device identifier 122. This mapping could include load-balancing and/or actual steering to a designated device (e.g., a particular VPN/ZTNA terminator). Additionally, or alternatively, it may be possible to rapidly setup the encrypted data plane session using a Resumed Handshake. This is because Session Resumption uses the assigned Session-ID (or equivalent thereof) for mapping. To facilitate the data plane setup with Resumed Handshake, the routing device 114 may propose a secret key as a part of the control plane exchange in order to bootstrap the cryptographic parameters to facilitate Session Resumption. In some examples, this process may be similar to zero round trip time resumption (0-RTT) bootstrapping that is used in QUIC, multiplexed application substrate over QUIC encryption (MASQUE), and/or hypertext transfer protocol version 3 (HTTP/3) sessions and may also provide a similar ecosystem for those protocol connections as well as for DTLS, TLS, IPsec tunnels, and/or the like. Additionally, or alternatively, the IPsec ESP header SPI attribute may be used in a similar manner to the DTLS client hello Session-ID.

Figure 2:
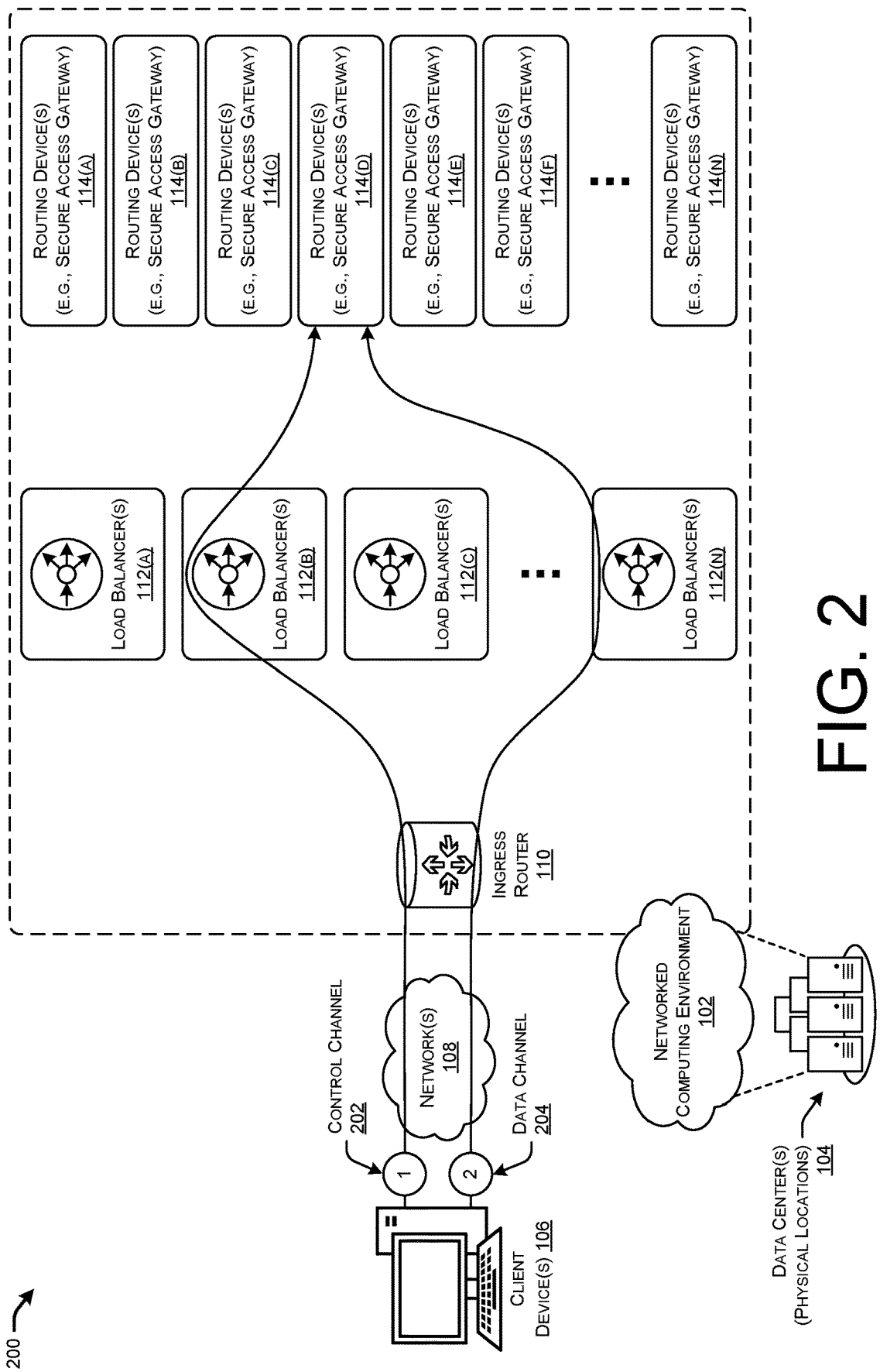
FIG. 2 illustrates a system-architecture diagram of another example environment for a networked computing environment to perform the routing, load-balancing, and/or firewalling techniques according to the techniques described herein.

FIG. 2 illustrates a system-architecture diagram of another example environment 200 for a networked computing environment 102 to perform the routing, load-balancing, and/or firewalling techniques according to the techniques described herein. In some examples, the networked computing environment 102 as illustrated in FIG. 2 may correspond to the networked computing environment 102, as described with respect to FIG. 1. Generally, the networked computing environment 102 may include devices that are housed or located in one or more data centers 104 that may be located at different physical locations. For instance, the networked computing environment 102 may be supported by networks of devices in a public cloud computing platform, a private/enterprise computing platform, and/or any combination thereof. The one or more data centers 104 may be physical facilities or buildings located across geographic areas that are designated to store networked devices that are part of the networked computing environment 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the networked computing environment 102 may not be located in explicitly defined data centers 104 and, rather, may be located in other locations or buildings.

The networked computing environment 102 may be accessible to client devices 106 over one or more networks 108, such as the Internet. The networked computing environment 102, and the networks 108, may each respectively include one or more networks implemented by any viable communication technology, such as wired and/or wireless modalities and/or technologies. The networked computing environment 102 and networks 108 may each include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The networked computing environment 102 may include devices, virtual resources, or other nodes that relay packets from one network segment to another by nodes in the computer network.

In some examples, the networked computing environment 102 may provide, host, or otherwise support one or more application services for client devices 106 to connect to and use. The client devices 106 may comprise any type of device configured to communicate using various communication protocols (e.g., VPN, SSL, TLS, DTLS, QUIC, IPsec, and/or any other protocol) over the networks 108. For instance, the client device 106 may comprise a personal user device (e.g., desktop computers, laptop computers, phones, tablets, wearable devices, entertainment devices such as televisions, etc.), network devices (e.g., servers, routers, switches, access points, etc.), and/or any other type of computing device.

At "1," a client device 106 may connect to a workload hosted by a given computing resource of the networked computing environment 102. For example, the workload(s) may be associated with an Anycast IP address, and the client device 106 may establish a control channel connection 202 to the Anycast IP address. The control channel connection 202 may first be load balanced by the ingress router 110 using ECMP to a first load balancer node 112(B). The first load balancer node 112(B) receives the control channel connection 202 and then may forward the connection to a control plane terminator of the routing device(s) 114(D). The terminator and/or the routing device(s) 114(D) may then share tunnel parameters including a communication session identifier with the client device 106. Additionally, or alternatively, an authentication configuration exchange may occur between the client 106 and the routing device(s) 114(D).

At "2," the client 106 may establish one or more data channel 204 connections to the same Anycast IP address. In some examples, the data plane channel(s) 204 may be load-balanced by the ingress router 110 using ECMP to a second load-balancer node 112(N) chose across the set of available nodes. In some examples, the chosen node may be the same load balancer node 112 (e.g., load-balancer 112(B)) that received the initial control channel connection or a different load-balancer node (e.g., load balancer 112(N)). Then, the second load-balancer 112(N) node may forward this data channel 204 to a data plane terminator that is hosted on the same server instance as the control plane terminator that the initial control channel connection was forwarded to (e.g., the routing device 114(D)). For example, the first load-balancer node 112(B) may forward the control channel 202 to the routing device 114(D) indicated by the communication session identifier and/or the load-balancer node 112(N) may forward the data channel 204 to the routing device 114(D) indicated by the communication session identifier.

Figure 3:
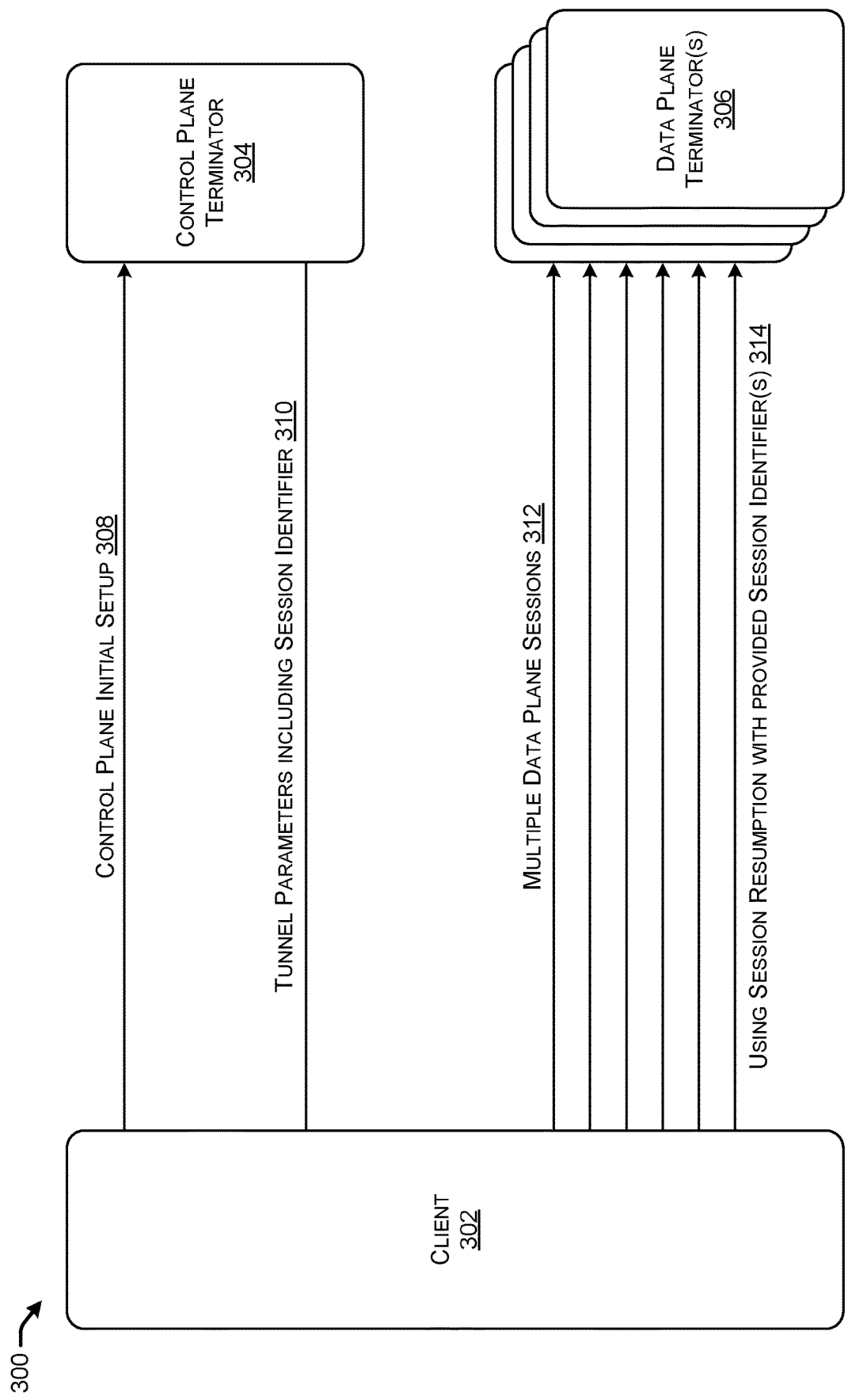
FIG. 3 illustrates an example data flow diagram between a client device and a control plane terminator and/or one or more data plane terminator(s).

FIG. 3 illustrates an example data flow diagram 300 between a client device 302 and a control plane terminator 304 and/or one or more data plane terminator(s) 306. In some examples, the client 302 may correspond to the client device(s) 106, as described with respect to FIG. 1. Additionally, or alternatively, the control plane terminator 304 and/or the data plane terminator(s) 306 may correspond to the routing device(s) 114(1)-(N), as described with respect to FIG. 1. While the control plane terminator 304 is illustrated as being separate from the data plane terminator(s) 306, it should be understood that the control plane terminator 304 may be executing on the same server instance as the data plane terminator(s) 306.

At 308, the client 302 may initiate the control plane initial setup. For example, the client 302 may establish a first control session connection to an Anycast IP address. In some examples, the first control session may be load-balanced, using equal-cost multi-pathing (ECMP) techniques, to a load-balancer node chosen across a set of available nodes. The load-balancer node that receives the first control session connection forwards it to the control plane terminator 304. In some examples, the control plane terminator 304 may be from among multiple available control plane terminator(s) 304.

At 310, tunnel parameters including a session identifier (e.g., a communication session identifier) are shared between the client 302 and the control plane terminator, and the first control session connection is established. Additionally, or alternatively, an authentication and configuration exchange may occur between the client 302 and the control plane terminator.

At 312, the client 302 may establish one or more data plane session connections to the same Anycast IP address. In some examples, the one or more data plane sessions may be load-balanced using ECMP to a load-balancer node chose across the set of available nodes. The chosen node may be the same node that received the initial control channel connection or a different node. Then, the chosen load-balancer node may forward this data channel to the data plane terminator 306 that is hosted on the same server instance as the control plane terminator 304 that the initial control channel connection was forwarded to.

At 314, Session Resumption may be utilized with the provided session identifiers to establish data plane session connections. In some examples, the data plane session connections may be established using a Resumed Handshake. Additionally, or alternatively, a disrupted data plane session connection may be reestablished using Session Resumption and without having to reconfigure the control plane.

FIGS. 4A-6B illustrate example packet headers, messages, records, and/or the like that may be utilized to perform the techniques described herein.

Figure 4A:
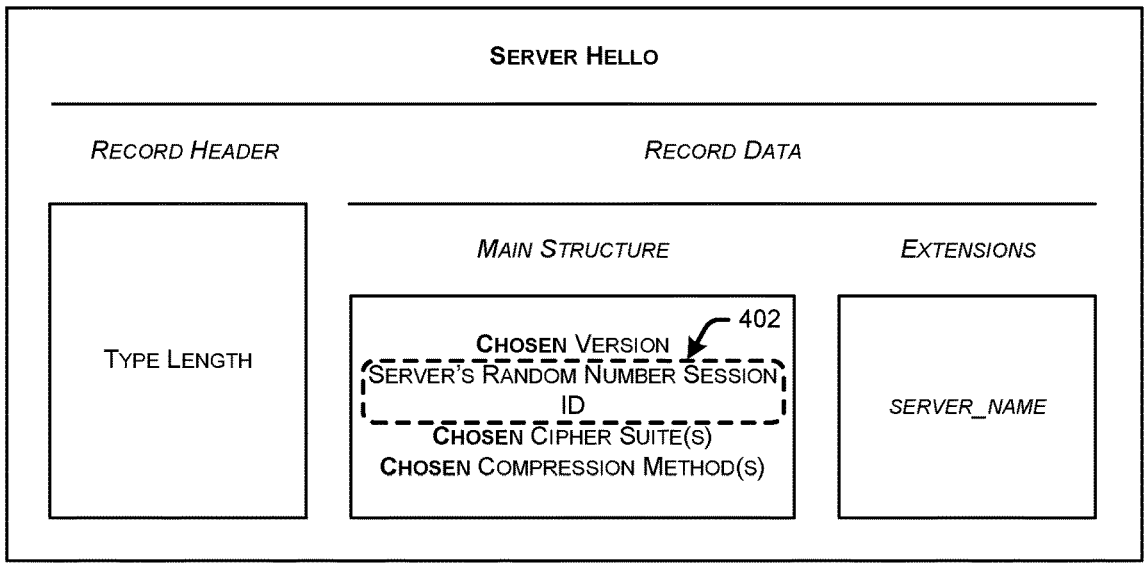
FIG. 4A illustrates an example TLS server hello message that may be utilized to perform the techniques described herein.

FIG. 4A illustrates an example TLS server hello message 400 that may be utilized in VPN sessions. In some examples, the server (e.g., routing device) may be chosen and indicated by the server's random number session ID field 402 (of the TLS server hello message 400. The server's random number session ID field 402 may be included in the main structure of the TLS server hello message 400. In some examples, the communication session identifier may be encoded into the server's random number session ID field 402.

Figure 4B:
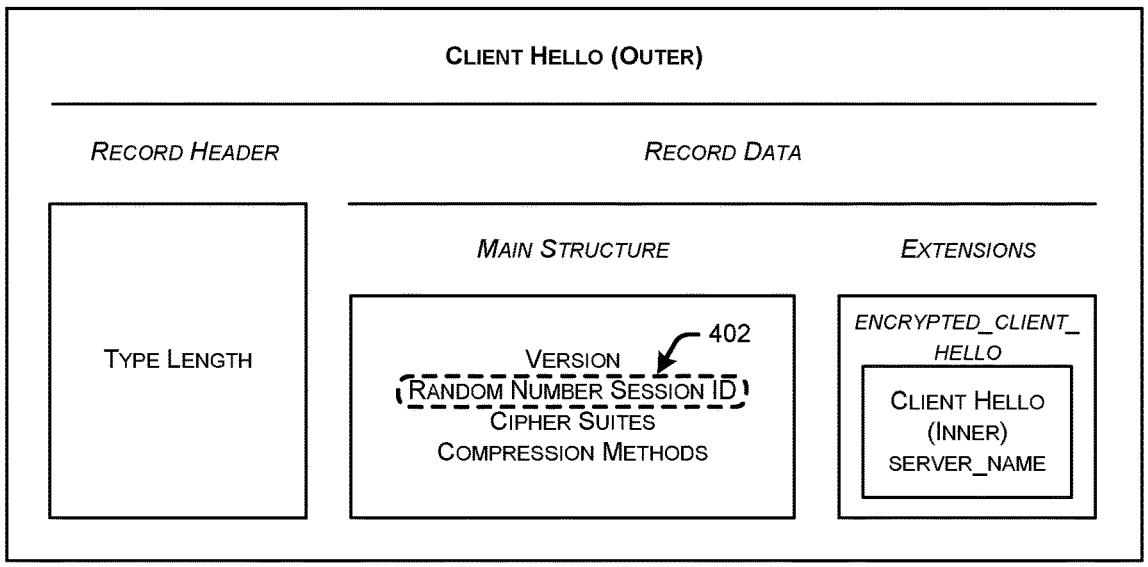
FIG. 4B illustrates an example TLS client hello message that may be utilized to perform the techniques described herein.

FIG. 4B illustrates an example TLS client hello message 410 that may be utilized in VPN sessions. In some examples, the client device may receive the TLS server hello message 400 indicating the server's random number session ID field 402 (e.g., the communication session identifier) and the client device may encode the communication session identifier into the random number session ID field 402 of a TLS client hello message 410. The random number session ID field 402 may be included in the main structure of the TLS client hello message 410.

Figures 5A, 5B:
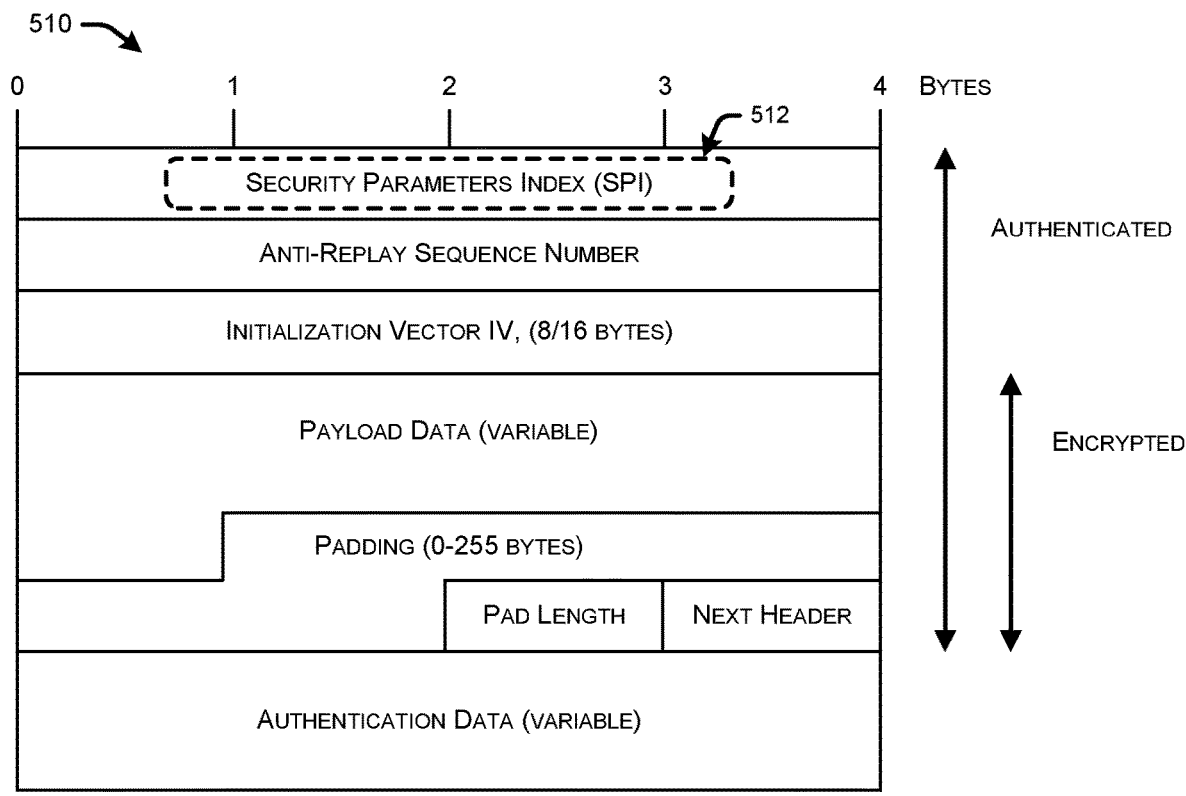
FIG. 5A illustrates an example DTLS record that may be utilized to perform the techniques described herein.
FIG. 5B illustrates an example encapsulating security payload (ESP) record that may be utilized to perform the techniques described herein.

FIG. 5A illustrates an example DTLS record 500 that may be utilized in DTLS-VPN sessions. In some examples, a new field may be added to a DTLS record 500, as illustrated. For example, a new field representing an opaque connection ID 502 may be added to the DTLS record. In some examples, the opaque connection ID 502 may be encoded with the communication session identifier. For example, one or more bits of the opaque connection ID 502 may be configured as a device identifier, such as, for example, the device identifier 122 as described with respect to FIG. 1.

FIG. 5B illustrates an example encapsulating security payload (ESP) record 510 that may be utilized in IPsec sessions. In some examples, the ESP record 510 may include a security parameters index 512. The ESP record 510 may be utilized in initial IPsec packets utilized to establish an IPsec connection according to the techniques described herein. In some examples, the communication session identifier may be encoded into the security parameters index 512. For example, one or more bits of the security parameters index 512 may be configured as a device identifier, such as, for example, the device identifier 122, as described with respect to FIG. 1.

Figure 6A:
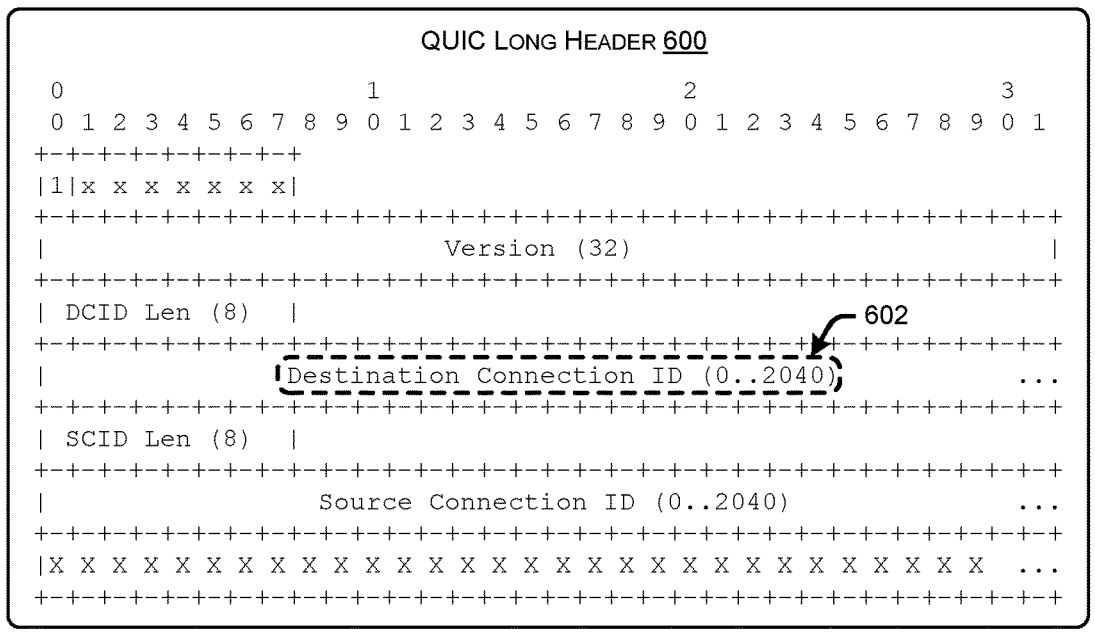
FIG. 6A illustrates an example QUIC long header that may be utilized to perform the techniques described herein.

FIG. 6A illustrates an example QUIC long header 600 utilized in QUIC packets. In some examples, the QUIC long header 600 may include a destination connection ID (DCID) 602 and/or a source connection ID (SCID). The QUIC long header 600 may be utilized in initial QUIC packets utilized to establish a QUIC connection (e.g., an initial control packet, client-hello, etc.) according to the techniques described herein. In some examples, the communication session identifier may be encoded into the DCID 602. For example, one or more of the bits of the DCID 602 may be configured as a device identifier, such as, for example, the device identifier 122, as described with respect to FIG. 1.

Figure 6B:
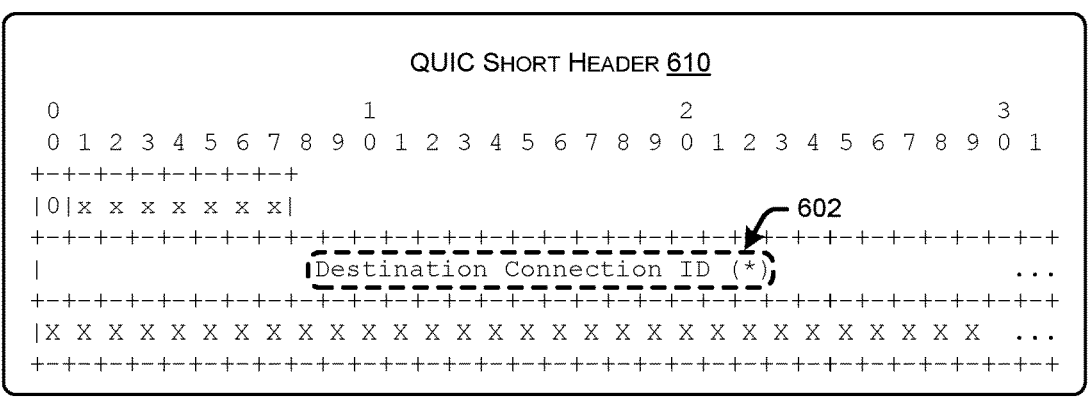
FIG. 6B illustrates an example QUIC short header that may be utilized to perform the techniques described herein.

FIG. 6B illustrates an example QUIC short header 610 that may be utilized in QUIC packets. In some examples, the QUIC short header 610 may include only a DCID 602. The QUIC short header 610 may be utilized in subsequent QUIC packets sent along as a stream of data via a QUIC connection, such as, for example, data packets and/or in data plane sessions.

Figure 7:
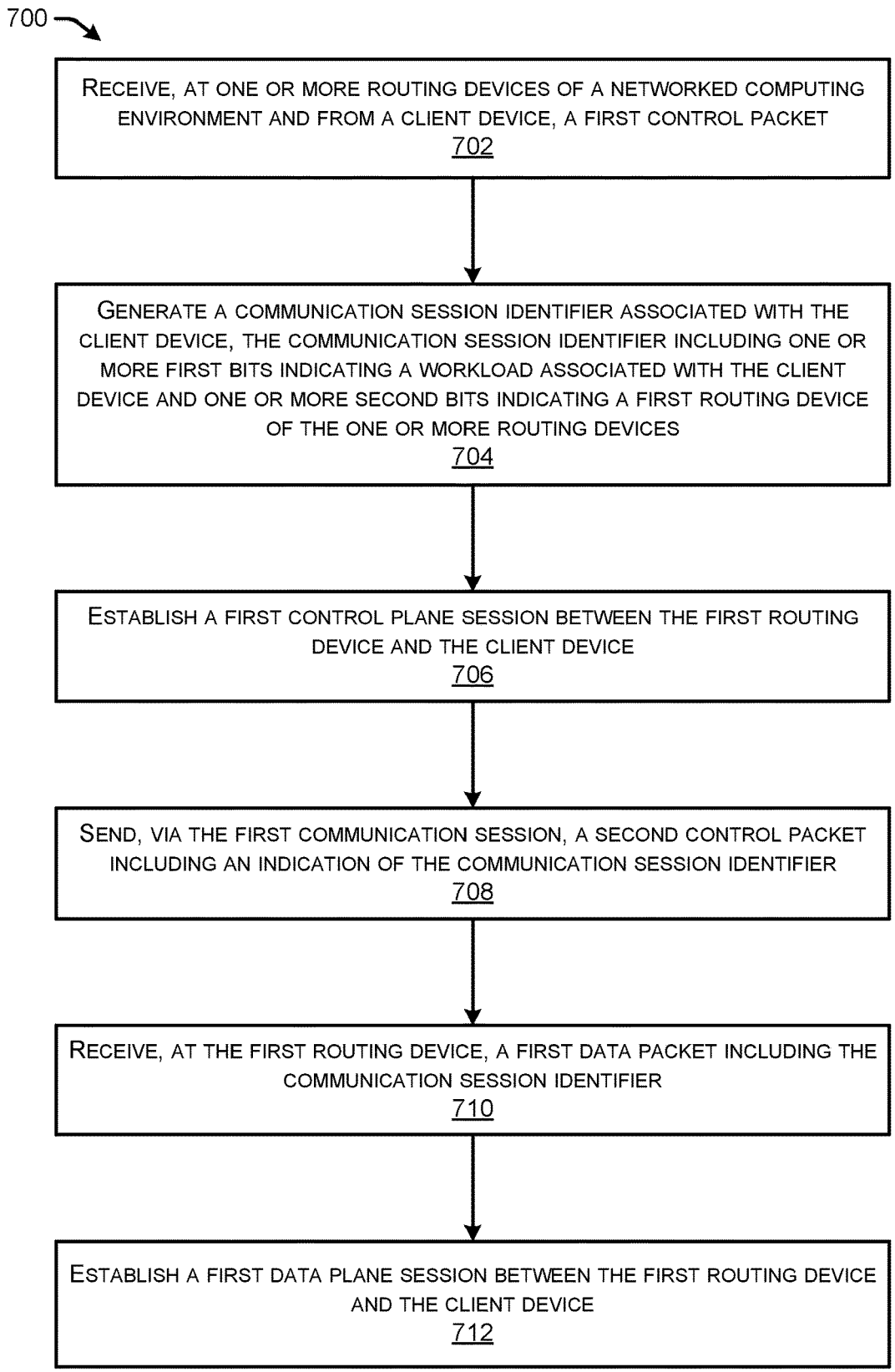
FIG. 7 illustrates a flow diagram of an example method for one or more routing devices of a networked computing environment to generate and/or utilize communication session identifier(s) indicating a target routing device to route control plane session and/or a data plane session(s) associated with a client device.
Figure 8:
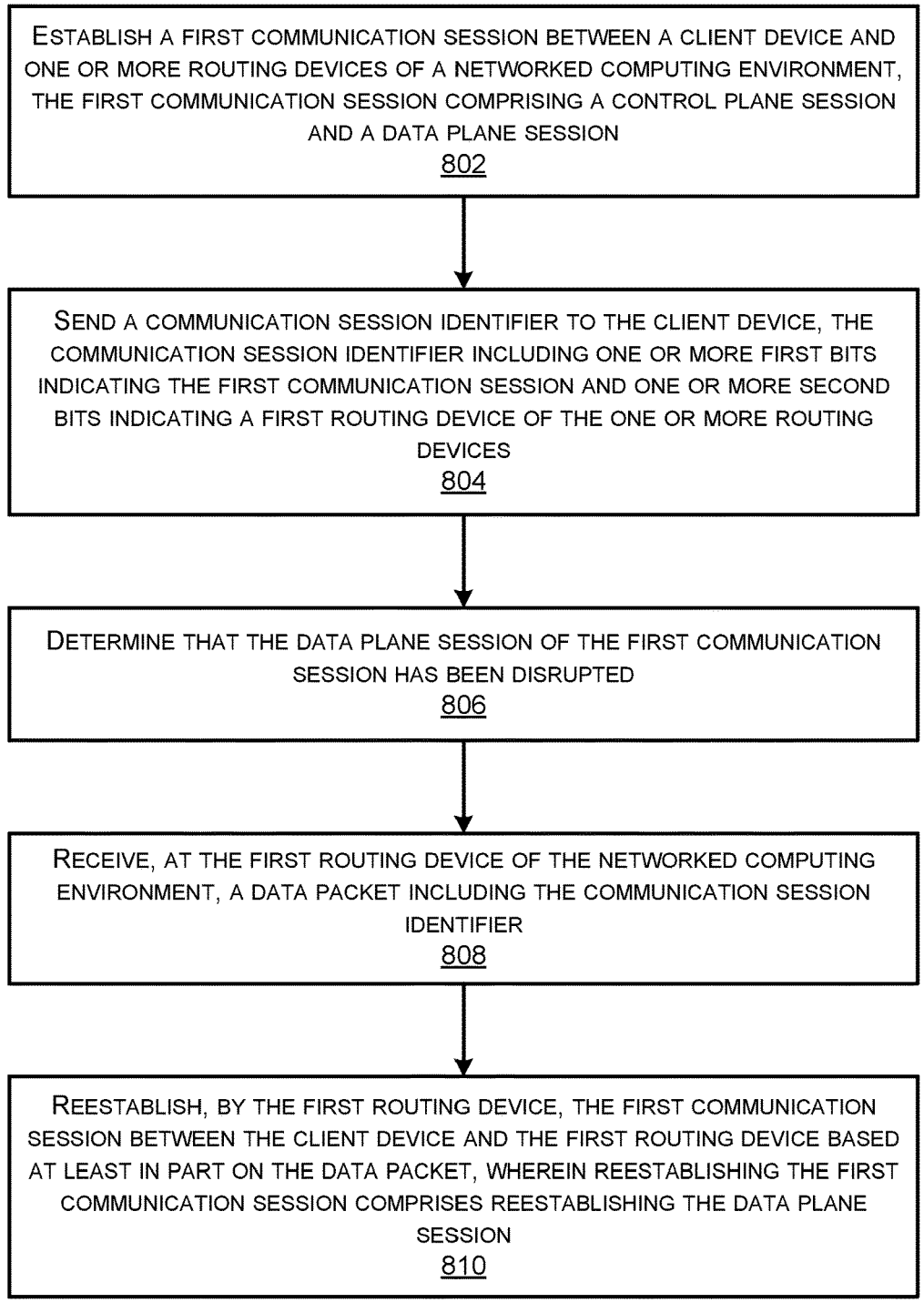
FIG. 8 illustrates a flow diagram of an example method for a routing device to establish a data plane session with a client device using a resumed handshake.

FIGS. 7 and 8 illustrate flow diagrams of example methods 700 and 800 and that illustrate aspects of the functions performed at least partly by the networked computing environment(s) 104 and/or by the respective components within as described in FIGS. 1 and 2. The logical operations described herein with respect to FIGS. 7 and 8 may be implemented (1) as a sequence of computer-implemented acts or program modules running on a computing system and/or (2) as interconnected machine logic circuits or circuit modules within the computing system. In some examples, the method(s) 700 and 800 may be performed by a system comprising one or more processors and one or more non-transitory computer-readable media storing computer-executable instructions that, when executed by the one or more processors, cause the one or more processors to perform the method(s) 700 and 800.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7 and 8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 illustrates a flow diagram of an example method 700 for one or more routing devices of a networked computing environment to generate and/or utilize communication session identifier(s) indicating a target routing device to route control plane session and/or a data plane session(s) associated with a client device. In some examples, the networked computing environment and/or the routing devices may correspond to the networked computing environment 102 and/or the routing devices 114, as described with respect to FIGS. 1 and 2. Additionally, or alternatively, the control plane session and/or the data plane session may correspond to the control channel 202 and/or the data channel 204, as described with respect to FIG. 2.

At 702, the method 700 may include receiving, at one or more routing devices of a networked computing environment and from a client device, a first control packet. In some examples, the client device may correspond to the client device 106, as described with respect to FIGS. 1 and 2. In some examples, the first control packet may be received from a load balancer, such as, for example, load balancer 112, as described with respect to FIGS. 1 and 2.

At 704, the method 700 may include generating a communication session identifier associated with the client device. In some examples, the communication session identifier may include one or more first bits indicating a workload associated with the client device and/or one or more second bits indicating a first routing device of the one or more routing devices. In some examples, the workload and/or the one or more second bits may correspond to the workload 116 and/or the device identifier 122, as described with respect to FIG. 1. In some examples, an initiating routing device may receive the first control packet, and share the communication session identifier with the client device, such that the client device may establish a control session with the first routing device targeted by the communication session identifier.

At 706, the method 700 may include establishing a first control plane session between the first routing device and the client device.

At 708, the method 700 may include sending, via the first control plane session, a second control packet including an indication of the communication session identifier.

At 710, the method 700 may include receiving, at the first routing device, a first data packet including the communication session identifier.

At 712, the method 700 may include establishing a first data plane session between the first routing device and the client device.

In some examples, the one or more first bits of the communication session identifier represent an anycast internet protocol (IP) address associated with the workload.

Additionally, or alternatively, the method 700 may include determining that the first data plane session has been disrupted. Additionally, or alternatively, the method 700 may include receiving, at the first routing device, one or more second data packets including the communication session identifier. Additionally, or alternatively, the method 700 may include reestablishing the first data plane session between the client device and the first routing device based at least in part on the communication session identifier.

Additionally, or alternatively, the method 700 may include sending, from the first routing device and to the client device, a request to authenticate the client device for access to the workload. Additionally, or alternatively, the method 700 may include receiving a second control packet including the communication session identifier and authentication credentials configured to authenticate the client device for access to the workload. In some examples, establishing the data plane session between the client device and the first routing device is based at least in part on the authentication credentials.

In some examples, the communication session identifier may be configured as at least one of: a datagram transport layer security (DTLS) client hello session ID, a quick user datagram protocol (UDP) internet connections (QUIC) destination connection ID (DCID), or an internet protocol security (IPsec) encapsulating security payload (ESP) header security parameter index (SPI) attribute.

Additionally, or alternatively, the method 700 may include receiving, the first routing device, one or more second data packets including the communication session identifier. Additionally, or alternatively, the method 700 may include establishing one or more second data plane sessions between the client device and the first routing device based at least in part on the computing resource identifier.

Additionally, or alternatively, the method 700 may include determining that a first usage associated with a second routing device of the one or more routing devices exceeds a threshold usage. Additionally, or alternatively, the method 700 may include determining that a second usage associated with the first routing device of the one or more routing devices is below the threshold usage. In some examples, generating the communication session identifier is based at least in part on determining that the first usage exceeds the threshold usage and that the second usage is below the threshold usage.

In some examples, the one or more routing devices may be configured as at least one of a virtual private network (VPN) gateway and/or a zero-trust network access (ZTNA) gateway.

FIG. 8 illustrates a flow diagram of an example method 800 for a routing device to establish a data plane session with a client device using a resumed handshake. In some examples, the routing device and/or the client device may correspond to the routing device 114 (or the control plane terminator 304 and/or the data plane terminator(s) 306) and/or the client devices 106, 302, as described with respect to FIGS. 1-3.

At 802, the method 800 may include establishing a first communication session between a client device and one or more routing devices of a networked computing environment. In some examples, the first communication session may comprise a control plane session and a data plane session.

At 804, the method 800 may include sending a communication session identifier to the client device. In some examples, the communication session identifier may include one or more first bits indicating the first communication session and/or one or more second bits indicating a first routing device of the one or more routing devices.

At 806, the method 800 may include determining that the data plane session of the first communication session has been disrupted.

At 808, the method 800 may include receiving, at the first routing device of the networked computing environment, a data packet including the communication session identifier.

At 810, the method 800 may include reestablishing, by the first routing device, the first communication session between the client device and the first routing device based at least in part on the data packet. In some examples, reestablishing the first communication session may comprise reestablishing the data plane session.

In some examples, the one or more first bits of the communication session identifier may further indicate an anycast internet protocol (IP) address associated with a workload associated with the client device.

In some examples, the communication session identifier is configured as at least one of a datagram transport layer security (DTLS) client hello session ID, a quick user datagram protocol (UDP) internet connections (QUIC) destination connection ID (DCID), and/or an internet protocol security (IPsec) encapsulating security payload (ESP) header security parameter index (SPI) attribute.

In some examples, the one or more routing devices may be configured as at least one of a virtual private network (VPN) gateway associated with the networked computing environment and/or a zero trust network access (ZTNA) gateway associated with the networked computing environment.

In some examples, the communication session identifier may be generated by the one or more routing devices. For example, the communication session identifier may be generated by an initial routing device that receives an initial control packet from a load balancer. Additionally, or alternatively, the control plane terminator associated with the one or more routing devices may be configured to generate the communication session identifier.

Figure 9:
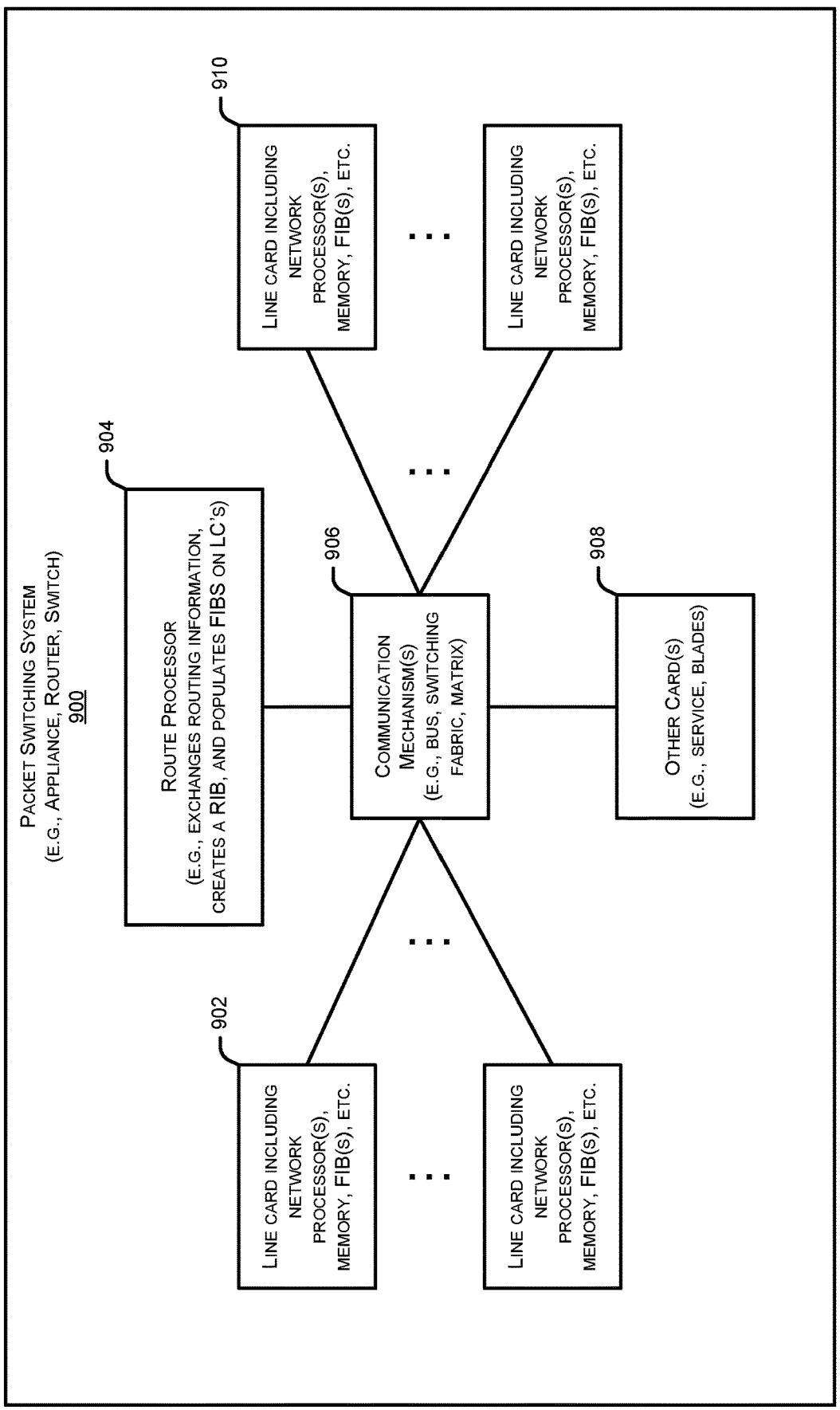
FIG. 9 illustrates a block diagram illustrating an example packet switching system that can be utilized to implement various aspects of the technologies disclosed herein.

FIG. 9 illustrates a block diagram illustrating an example packet switching device (or system) 900 that can be utilized to implement various aspects of the technologies disclosed herein. In some examples, packet switching device(s) 900 may be employed in various networks, such as, for example, the networked computing environment 102 as described with respect to FIGS. 1 and 2, respectively.

In some examples, a packet switching device 900 may comprise multiple line card(s) 902, 910, each with one or more network interfaces for sending and receiving packets over communications links (e.g., possibly part of a link aggregation group). The packet switching device 900 may also have a control plane with one or more processing elements 904 for managing the control plane and/or control plane processing of packets associated with forwarding of packets in a network. The packet switching device 900 may also include other cards 908 (e.g., service cards, blades) which include processing elements that are used to process (e.g., forward/send, drop, manipulate, change, modify, receive, create, duplicate, apply a service) packets associated with forwarding of packets in a network. The packet switching device 900 may comprise hardware-based communication mechanism 906 (e.g., bus, switching fabric, and/or matrix, etc.) for allowing its different entities 902, 904, 908 and 910 to communicate. Line card(s) 902, 910 may typically perform the actions of being both an ingress and/or an egress line card 902, 910, in regard to multiple other particular packets and/or packet streams being received by, or sent from, packet switching device 900.

Figure 10:
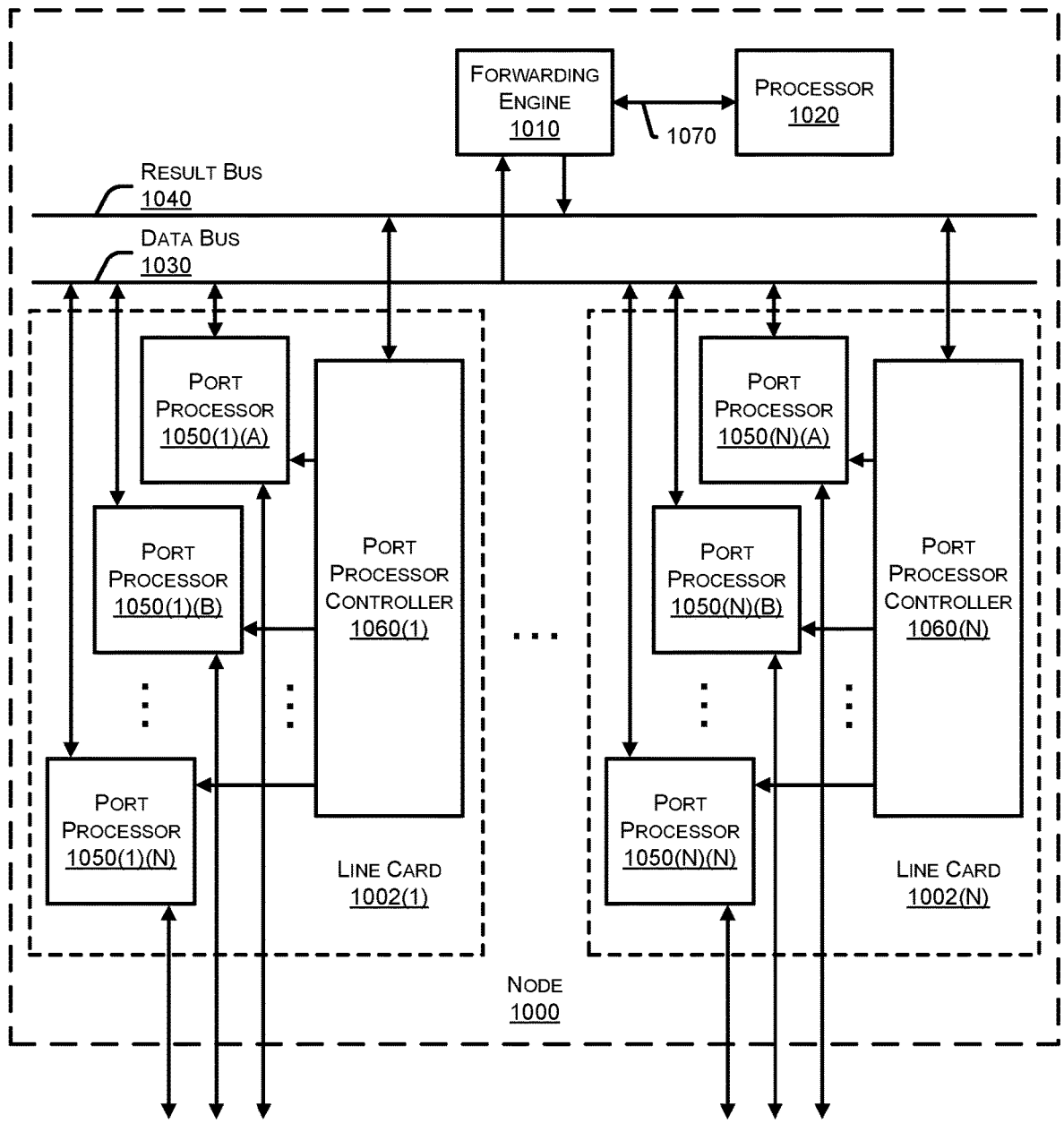
FIG. 10 illustrates a block diagram illustrating certain components of an example node that can be utilized to implement various aspects of the technologies disclosed herein.

FIG. 10 illustrates a block diagram illustrating certain components of an example node 1000 that can be utilized to implement various aspects of the technologies disclosed herein. In some examples, node(s) 1000 may be employed in various networks, such as, for example, the networked computing environment 102 as described with respect to FIGS. 1 and 2, respectively.

In some examples, node 1000 may include any number of line cards 1002 (e.g., line cards 1002(1)-(N), where N may be any integer greater than 1) that are communicatively coupled to a forwarding engine 1010 (also referred to as a packet forwarder) and/or a processor 1020 via a data bus 1030 and/or a result bus 1040. Line cards 1002(1)-(N) may include any number of port processors 1050(1)(A)-(N)(N) which are controlled by port processor controllers 1060(1)-(N), where N may be any integer greater than 1. Additionally, or alternatively, forwarding engine 1010 and/or processor 1020 are not only coupled to one another via the data bus 1030 and the result bus 1040, but may also communicatively coupled to one another by a communications link 1070.

The processors (e.g., the port processor(s) 1050 and/or the port processor controller(s) 1060) of each line card 1002 may be mounted on a single printed circuit board. When a packet or packet and header are received, the packet or packet and header may be identified and analyzed by node 1000 (also referred to herein as a router) in the following manner. Upon receipt, a packet (or some or all of its control information) or packet and header may be sent from one of port processor(s) 1050(1)(A)-(N)(N) at which the packet or packet and header was received and to one or more of those devices coupled to the data bus 1030 (e.g., others of the port processor(s) 1050(1)(A)-(N)(N), the forwarding engine 1010 and/or the processor 1020). Handling of the packet or packet and header may be determined, for example, by the forwarding engine 1010. For example, the forwarding engine 1010 may determine that the packet or packet and header should be forwarded to one or more of port processors 1050(1)(A)-(N)(N). This may be accomplished by indicating to corresponding one(s) of port processor controllers 1060 (1)-(N) that the copy of the packet or packet and header held in the given one(s) of port processor(s) 1050(1)(A)-(N)(N) should be forwarded to the appropriate one of port processor(s) 1050(1)(A)-(N)(N). Additionally, or alternatively, once a packet or packet and header has been identified for processing, the forwarding engine 1010, the processor 1020, and/or the like may be used to process the packet or packet and header in some manner and/or may add packet security information in order to secure the packet. On a node 1000 sourcing such a packet or packet and header, this processing may include, for example, encryption of some or all of the packet's or packet and header's information, the addition of a digital signature, and/or some other information and/or processing capable of securing the packet or packet and header. On a node 1000 receiving such a processed packet or packet and header, the corresponding process may be performed to recover or validate the packet's or packet and header's information that has been secured.

Figure 11:
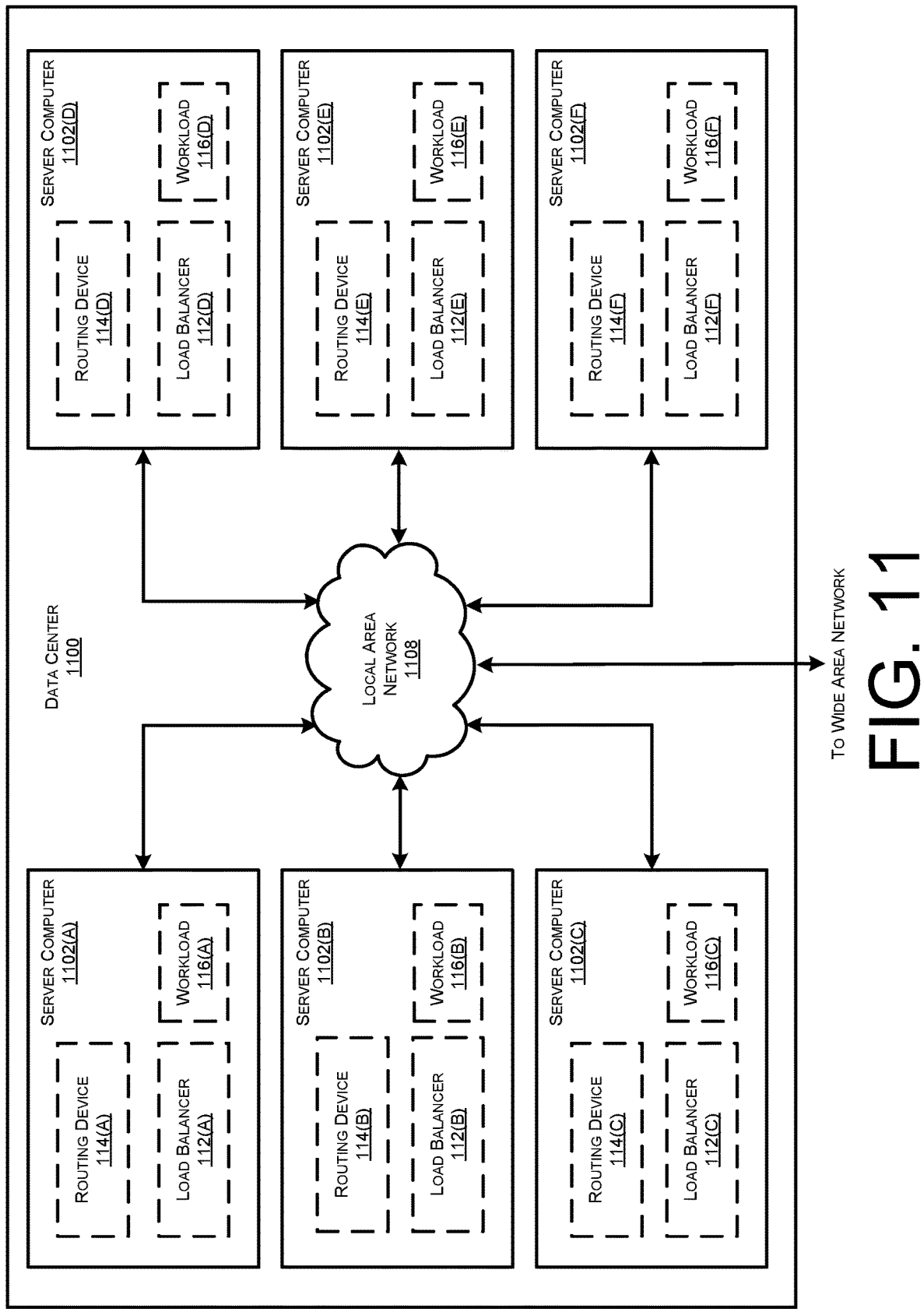
FIG. 11 illustrates a computing system diagram illustrating a configuration for a data center that can be utilized to implement aspects of the technologies disclosed herein.

FIG. 11 is a computing system diagram illustrating a configuration for a data center 1100 that can be utilized to implement aspects of the technologies disclosed herein. The example data center 1100 shown in FIG. 11 includes several server computers 1102A-1102E (which might be referred to herein singularly as "a server computer 1102" or in the plural as "the server computers 1102") for providing computing resources. In some examples, the server computers 1102 may include, or correspond to, the servers associated with the site (or data center) 104, the packet switching system 900, and/or the node 1000 described herein with respect to FIGS. 1, 7 and 8, respectively.

The server computers 1102 can be standard tower, rack-mount, or blade server computers configured appropriately for providing the computing resources described herein. As mentioned above, the computing resources provided by the networked computing environment 102 can be data processing resources such as VM instances or hardware computing systems, database clusters, computing clusters, storage clusters, data storage resources, database resources, networking resources, and others. Some of the servers 1102 can also be configured to execute a resource manager capable of instantiating and/or managing the computing resources. In the case of VM instances, for example, the resource manager can be a hypervisor or another type of program configured to enable the execution of multiple VM instances on a single server computer 1102. Server computers 1102 in the data center 1100 can also be configured to provide network services and other types of services.

In the example data center 1100 shown in FIG. 11, an appropriate LAN 1108 is also utilized to interconnect the server computers 1102A-1102E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 1100, between each of the server computers 1102A-1102E in each data center 1100, and, potentially, between computing resources in each of the server computers 1102. It should be appreciated that the configuration of the data center 1100 described with reference to FIG. 11 is merely illustrative and that other implementations can be utilized.

In some examples, the server computers 1102 may each execute a routing device 114, a load-balancer 112, and/or a workload 116.

In some instances, the networked computing environment 102 may provide computing resources, like application containers, VM instances, and storage, on a permanent or an as-needed basis. Among other types of functionality, the computing resources provided by the networked computing environment 102 may be utilized to implement the various services described above. The computing resources provided by the networked computing environment 102 can include various types of computing resources, such as data processing resources like application containers and VM instances, data storage resources, networking resources, data communication resources, network services, and the like.

Each type of computing resource provided by the networked computing environment 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The networked computing environment 102 can also be configured to provide other types of computing resources not mentioned specifically herein.

The computing resources provided by the networked computing environment 102 may be enabled in one embodiment by one or more data centers 1100 (which might be referred to herein singularly as "a data center 1100" or in the plural as "the data centers 1100"). The data centers 1100 are facilities utilized to house and operate computer systems and associated components. The data centers 1100 typically include redundant and backup power, communications, cooling, and security systems. The data centers 1100 can also be located in geographically disparate locations. One illustrative embodiment for a data center 1100 that can be utilized to implement the technologies disclosed herein will be described below with regard to FIG. 12.

Figure 12:
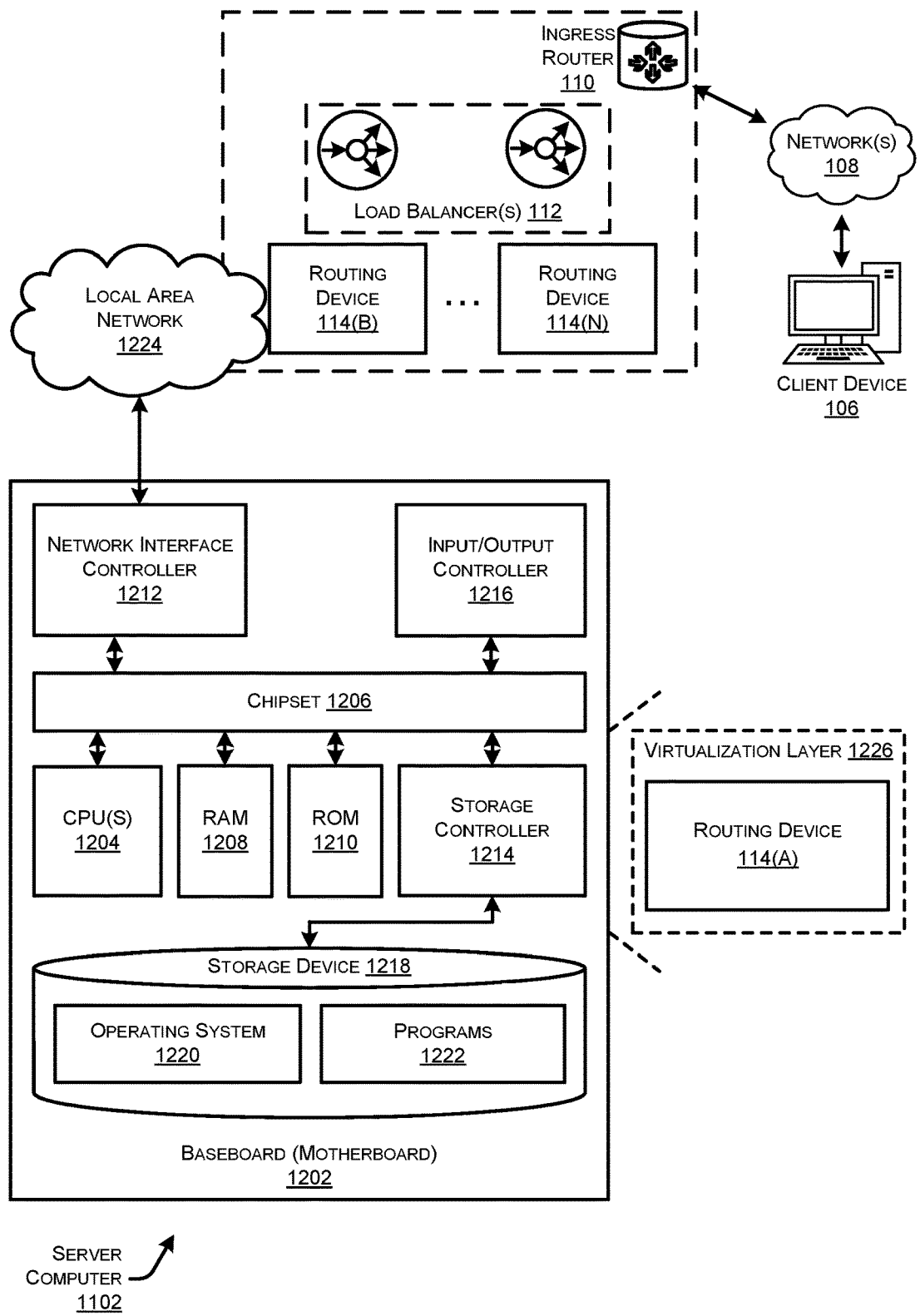
FIG. 12 is a computer architecture diagram showing an illustrative computer hardware architecture for implementing a server device that can be utilized to implement aspects of the various technologies presented herein.

FIG. 12 shows an example computer architecture for a computing device (or network routing device) 1102 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein. The computing device 1102 may, in some examples, correspond to a physical server of a data center 104, the packet switching system 900, and/or the node 1000 described herein with respect to FIGS. 1, 7, and 8, respectively.

The computing device 1102 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computing device 1102.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computing device 1102. The chipset 1206 can further provide an interface to a computer-readable storage medium such as a read-only memory ("ROM") 121210 or non-volatile RAM ("NVRAM") for storing basic routines that help to startup the computing device 1102 and to transfer information between the various components and devices. The ROM 121210 or NVRAM can also store other software components necessary for the operation of the computing device 1102 in accordance with the configurations described herein.

The computing device 1102 can operate in a networked environment using logical connections to remote computing devices and computer systems through a network, such as the network 1224 (or 1108). The chipset 1206 can include functionality for providing network connectivity through a NIC 1212, such as a gigabit Ethernet adapter. The NIC 1212 is capable of connecting the computing device 1102 to other computing devices over the network 1224. It should be appreciated that multiple NICs 1212 can be present in the computing device 1102, connecting the computer to other types of networks and remote computer systems.

The computing device 1102 can be connected to a storage device 1218 that provides non-volatile storage for the computing device 1102. The storage device 1218 can store an operating system 1220, programs 1222, and data, which have been described in greater detail herein. The storage device 1218 can be connected to the computing device 1102 through a storage controller 1214 connected to the chipset 1206. The storage device 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1102 can store data on the storage device 1218 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1218 is characterized as primary or secondary storage, and the like.

For example, the computing device 1102 can store information to the storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1102 can further read information from the storage device 1218 by detecting the physical states or characteristics of one or more particular locations within the physical storage units.

In addition to the mass storage device 1218 described above, the computing device 1102 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 1102. In some examples, the operations performed by the networked computing environment 102, and or any components included therein, may be supported by one or more devices similar to computing device 1102. Stated otherwise, some or all of the operations performed by the networked computing environment 102, and or any components included therein, may be performed by one or more computing device 1102 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1218 can store an operating system 1220 utilized to control the operation of the computing device 1102. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1218 can store other system or application programs and data utilized by the computing device 1102.

In one embodiment, the storage device 1218 or other computer-readable storage media is encoded with computer-executable instructions which, when loaded into the computing device 1102, transform the computer from a general-purpose computing system into a special-purpose computer capable of implementing the embodiments described herein. These computer-executable instructions transform the computing device 1102 by specifying how the CPUs 1204 transition between states, as described above. According to one embodiment, the computing device 1102 has access to computer-readable storage media storing computer-executable instructions which, when executed by the computing device 1102, perform the various processes described above with regard to FIGS. 5 and 6. The computing device 1102 can also include computer-readable storage media having instructions stored thereupon for performing any of the other computer-implemented operations described herein.

The computing device 1102 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computing device 1102 might not include all of the components shown in FIG. 12, can include other components that are not explicitly shown in FIG. 12, or might utilize an architecture completely different than that shown in FIG. 12.

The server computer 1102 may support a virtualization layer 1226, such as one or more components associated with the networked computing environment 102, such as, for example, a routing device 114(B) of the one or more routing devices 114. The routing device 114(A) may be configured to generate communication session identifiers including an indication of a routing device 114 or a network tunnel associated with that routing device 114 for establishing a control plane session and/or one or more data plane sessions between the routing device 114 (A) and the client device 106. That is, the load-balancers 112 may utilize the communication session identifier, or a portion thereof, to forward one or more control sessions and/or data session to the routing device 114 (A) indicated by the communication session identifier.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, at one or more routing devices of a networked computing environment and from a client device, a first control packet;
   generating a communication session identifier associated with the client device, the communication session identifier including one or more first bits indicating a workload associated with the client device and one or more second bits indicating a first routing device of the one or more routing devices;

sending, from the first routing device and to the client device, a request to authenticate the client device for access to the workload;
receiving a second control packet including the communication session identifier and authentication credentials configured to authenticate the client device for access to the workload;
establishing a first control plane session between the first routing device and the client device;
sending, via the first control plane session, a second control packet including an indication of the communication session identifier;
receiving, at the first routing device, a first data packet including the communication session identifier; and
establishing a first data plane session between the first routing device and the client device based at least in part on the authentication credentials.

2. The method of claim 1, wherein the one or more first bits of the communication session identifier represent an anycast internet protocol (IP) address associated with the workload.

3. The method of claim 1, further comprising:
determining that the first data plane session has been disrupted;
receiving, at the first routing device, one or more second data packets including the communication session identifier; and
reestablishing the first data plane session between the client device and the first routing device based at least in part on the communication session identifier.

4. The method of claim 1, wherein the communication session identifier is configured as one of:
a datagram transport layer security (DTLS) client hello session ID;
a quick user datagram protocol (UDP) internet connections (QUIC) destination connection ID (DCID); or
an internet protocol security (IPsec) encapsulating security payload (ESP) header security parameter index (SPI) attribute.

5. The method of claim 1, further comprising:
receiving, at the first routing device, one or more second data packets including the communication session identifier; and
establishing one or more second data plane sessions between the client device and the first routing device based at least in part on the communication session identifier.

6. The method of claim 1, further comprising:
determining that a first usage associated with a second routing device of the one or more routing devices exceeds a threshold usage; and
determining that a second usage associated with the first routing device of the one or more routing devices is below the threshold usage;
wherein generating the communication session identifier is based at least in part on determining that the first usage exceeds the threshold usage and that the second usage is below the threshold usage.

7. The method of claim 1, wherein the one or more routing devices are configured as at least one of:
a virtual private network (VPN) gateway; or
a zero trust network access (ZTNA) gateway.

8. A system comprising:
one or more processors; and
one or more computer-readable media storing computer-executable instructions that, when executed by the one or more processors, cause the one or more processors to perform operations comprising:
receiving, at one or more routing devices of a networked computing environment and from a client device, a first control packet;
determining that a first usage associated with a second target routing device of the one or more routing devices exceeds a threshold usage;
determining that a second usage associated with the first target routing device of the one or more routing devices is below the threshold usage;
generating, based at least in part on determining that the first usage exceeds the threshold usage and that the second usage is below the threshold usage, a communication session identifier associated with the client device, the communication session identifier including one or more first bits indicating a workload and one or more second bits indicating a first target routing device of the one or more routing devices;
establishing a first communication session between the first target routing device and the client device;
sending, via the first communication session, a second control packet including an indication of the communication session identifier;
receiving, at the first target routing device, one or more first data packets including the communication session identifier; and
establishing one or more second communication sessions between the first target routing device and the client device.

9. The system of claim 8, wherein the communication session identifier is configured as one of:
a datagram transport layer security (DTLS) client hello session ID;
a quick user datagram protocol (UDP) internet connections (QUIC) destination connection ID (DCID); or
an internet protocol security (IPsec) encapsulating security payload (ESP) header security parameter index (SPI) attribute.

10. The system of claim 8, the operations further comprising:
determining that a third communication session of the one or more second communication sessions has been disrupted;
receiving, at the first target routing device, one or more second data packet including the communication session identifier; and
reestablishing the third communication session based at least in part on the communication session identifier.

11. The system of claim 8, wherein the one or more routing devices are configured as at least one of:
a virtual private network (VPN) gateway associated with the networked computing environment; or
a zero trust network access (ZTNA) gateway associated with the networked computing environment.

12. The system of claim 8, wherein the first communication session is a control plane session and the one or more second communication sessions are data plane sessions.

13. The system of claim 8, the operations further comprising:
sending, from the first target routing device and to the client device, a request to authenticate the client device for access to the workload; and
receiving a second control packet including the communication session identifier and authentication credentials configured to authenticate the client device for access to the workload;

wherein establishing the one or more second communication sessions between the client device and the first target routing device is based at least in part on the authentication credentials.

14. A method comprising:
establishing a first communication session between a client device and one or more routing devices of a networked computing environment, the first communication session comprising a control plane session and a data plane session;
sending a quick user datagram protocol (UDP) internet connections (QUIC) destination connection identifier (DCID) to the client device, the QUIC DCID including one or more first bits indicating the first communication session and one or more second bits indicating a first routing device of the one or more routing devices;
determining that the data plane session of the first communication session has been disrupted;
receiving, at the first routing device of the networked computing environment, a data packet including the QUIC DCID; and
reestablishing, by the first routing device, the first communication session between the client device and the first routing device based at least in part on the data packet, wherein reestablishing the first communication session comprises reestablishing the data plane session.

15. The method of claim 14, wherein the one or more first bits of the QUIC DCID further indicates an anycast internet protocol (IP) address associated with a workload associated with the client device.

16. The method of claim 14, wherein the one or more routing devices are configured as at least one of:
a virtual private network (VPN) gateway associated with the networked computing environment; or
a zero trust network access (ZTNA) gateway associated with the networked computing environment.

17. The method of claim 14, wherein the communication session identifier is generated by the one or more routing devices.

18. The system of claim 8, wherein the one or more first bits of the communication session identifier represent an anycast internet protocol (IP) address associated with the workload.

19. The system of claim 8, the operations further comprising:
receiving, at the first target routing device, one or more second data packets including the communication session identifier; and
establishing one or more third communication sessions between the client device and the first target routing device based at least in part on the communication session identifier.

20. The method of claim 14, wherein the data packet is a first data packet, and the method further comprising:
receiving, at the first routing device, a second data packet including the communication session identifier; and
establishing, by the first routing device, a second communication session between the client device and the first routing device based at least in part on the communication session identifier, wherein the second communication session includes another data plane session.

* * * * *